United States Patent
Yokota (10) Patent No.: US 10,659,878 B2
(45) Date of Patent: May 19, 2020

(54) SPEAKER DEVICE AND SOUND OUTPUT METHOD

(71) Applicant: DENSO TEN Limited, Kobe-shi, Hyogo (JP)

(72) Inventor: Yohei Yokota, Kobe (JP)

(73) Assignee: DENSO TEN LIMITED, Kobe (JP)

( * ) Notice: Subject to any disclaimer, the term of this patent is extended or adjusted under 35 U.S.C. 154(b) by 0 days.

(21) Appl. No.: 16/264,810

(22) Filed: Feb. 1, 2019

(65) Prior Publication Data
US 2019/0261086 A1 Aug. 22, 2019

(30) Foreign Application Priority Data
Feb. 22, 2018 (JP) ................................ 2018-030038

(51) Int. Cl.
*H04R 3/12* (2006.01)
*H04R 1/02* (2006.01)
*H04B 11/00* (2006.01)

(52) U.S. Cl.
CPC .............. *H04R 3/12* (2013.01); *H04B 11/00* (2013.01); *H04R 1/028* (2013.01); *H04R 2420/07* (2013.01); *H04R 2499/13* (2013.01); *H04R 2499/15* (2013.01)

(58) Field of Classification Search
CPC combination set(s) only.
See application file for complete search history.

(56) References Cited

U.S. PATENT DOCUMENTS

| 6,807,281 | B1* | 10/2004 | Sasaki | H04R 1/403 381/111 |
| 8,879,766 | B1* | 11/2014 | Zhang | H04R 1/028 381/333 |
| 2005/0249356 | A1* | 11/2005 | Holmi | B60R 11/0217 381/86 |
| 2010/0027832 | A1* | 2/2010 | Koseki | H04R 1/323 381/387 |
| 2010/0277646 | A1* | 11/2010 | Jeong | H04R 5/02 348/564 |
| 2012/0120218 | A1* | 5/2012 | Flaks | G10L 21/028 348/77 |
| 2018/0370365 | A1* | 12/2018 | Lee | G06F 3/0487 |

FOREIGN PATENT DOCUMENTS

JP 2005-217807 A 8/2005
JP 2008022347 A * 1/2008

* cited by examiner

*Primary Examiner* — Duc Nguyen
*Assistant Examiner* — Assad Mohammed
(74) *Attorney, Agent, or Firm* — Oliff PLC

(57) ABSTRACT

A speaker device according to an embodiment includes a vibration element, a driving unit, and a panel. The driving unit applies, to the vibration element, a driving signal where a carrier wave in an ultrasonic wave band is modulated by a sound signal in an audible wave band. The panel is provided with the vibration element and arranged in such a manner that a driving signal is applied to such a vibration element by the driving unit to form a vibration region and first and second ultrasonic waves that are generated from such a vibration region and travel in mutually different directions travel toward respectively different users.

13 Claims, 6 Drawing Sheets

| | TARGET OF OUTPUT | SPECIFIC EXAMPLE |
|---|---|---|
| 1 | SOUND IN PARTICULAR FREQUENCY BAND | FREQUENCY BAND THAT CORRESPONDS TO HUMAN VOICE |
| 2 | SOUND AT PARTICULAR CHANNEL IN SURROUND REPRODUCTION | CENTER CHANNEL |
| 3 | SOUND THAT CORRESPONDS TO PARTICULAR OBJECT IN OBJECT AUDIO REPRODUCTION | SPEECH |

SPEAKER DEVICE AND SOUND OUTPUT METHOD

CROSS-REFERENCE TO RELATED APPLICATION

This application is based upon and claims the benefit of priority of the prior Japanese Patent Application No. 2018-030038, filed on Feb. 22, 2018, the entire contents of which are incorporated herein by reference.

FIELD

A disclosed embodiment relate to a speaker device and a sound output method.

BACKGROUND

A reproduction system has conventionally been known that is capable of reproducing independent multimedia sources in a front seat and a rear seat in a vehicle interior of a vehicle. In such a system, for example, a speaker near a front seat is used in the front seat and a speaker near a rear seat is used in the rear seat, so that it is possible to listen to sounds from different multimedia sources at front and rear of a vehicle interior.

However, a vehicle interior is one space, so that sounds at front and rear of the vehicle interior may be mixed to cause mutual listening to be difficult. Accordingly, a technique has been proposed that provides a speaker that has a directionality for each of front and rear seats of a vehicle and reproduces a sound from such a speaker independently in each seat, so that each user that sits in each seat readily listens to such a sound (see Japanese Laid-open Patent Publication No. 2005-217807, for example).

However, in a conventional technique as described above, there is room for further improvement in that each of a plurality of users readily listens to a sound by a simple configuration. Specifically, in a conventional technique as described above, speakers have to be provided according to a number that corresponds to at least the number of seats in a vehicle interior, so that a configuration tends to be complicated.

SUMMARY

A speaker device according to an embodiment includes a vibration element, a driving unit, and a panel. The driving unit applies, to the vibration element, a driving signal where a carrier wave in an ultrasonic wave band is modulated by a sound signal in an audible wave band. The panel is provided with the vibration element and arranged in such a manner that a driving signal is applied to such a vibration element by the driving unit to form a vibration region and first and second ultrasonic waves that are generated from such a vibration region and travel in mutually different directions travel toward respectively different users.

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF EMBODIMENT

Hereinafter, an embodiment(s) of a speaker device and a sound output method as disclosed in the present application will be explained in detail, with reference to the accompanying drawing(s). Additionally, this invention is not limited by an embodiment(s) as illustrated below.

1. Outline of Speaker Device 1

Figure 1A:
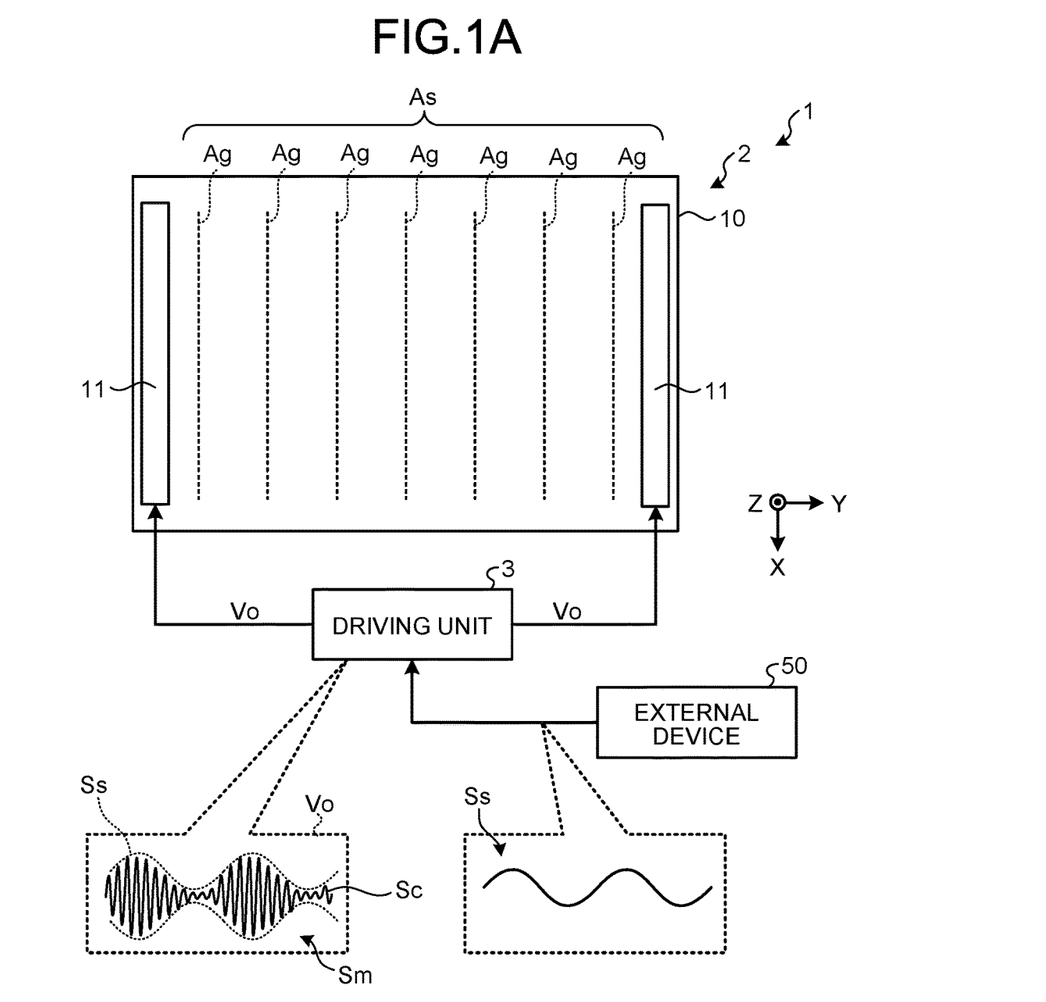
FIG. 1A is a diagram illustrating a general configuration of a speaker device according to an embodiment.
Figure 1B:
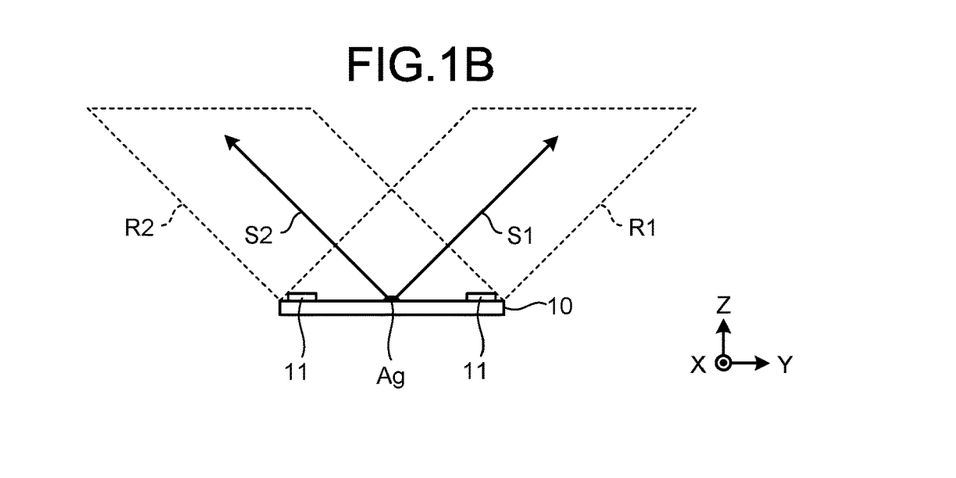
FIG. 1B is a diagram illustrating directions of travel of a first ultrasonic wave and a second ultrasonic wave that are generated from respective band-shaped vibration regions.
Figure 1C:
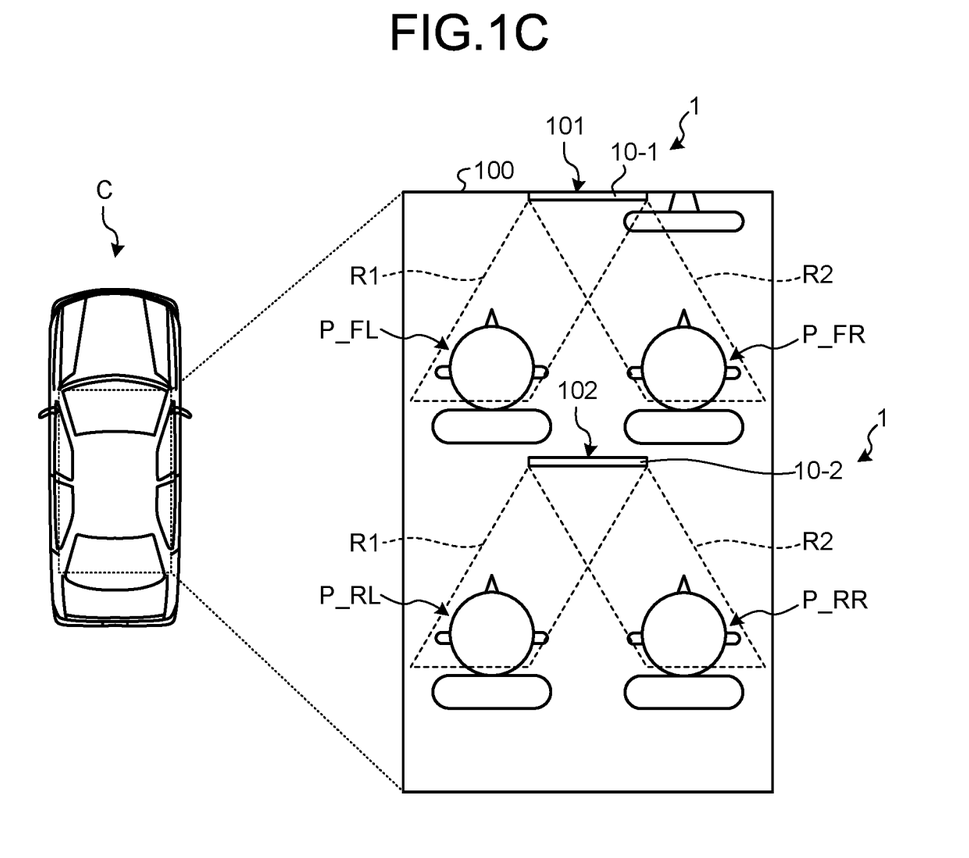
FIG. 1C is a diagram illustrating an example of arrangement of a speaker device according to an embodiment.

First, an outline of a speaker device 1 according to the present embodiment will be explained by using FIG. 1A to FIG. 1C. FIG. 1A is a diagram illustrating a general configuration of the speaker device 1 according to the present embodiment. Furthermore, FIG. 1B is a diagram illustrating directions of travel of a first ultrasonic wave S1 and a second ultrasonic wave S2 that are generated from respective band-shaped vibration regions Ag. Furthermore, FIG. 1C is a diagram illustrating an example of arrangement of the speaker device 1 according to the present embodiment.

As illustrated in FIG. 1A, the speaker device 1 includes a sound output unit 2 and a driving unit 3. For example, the speaker device 1 functions as a speaker device of an acoustic system that is mounted on a vehicle. Additionally, a target for mounting of the speaker device 1 is not limited to an acoustic system of a vehicle but may be an acoustic system that is provided in a facility such as a house.

The sound output unit 2 includes a panel 10 and a vibration element 11. The panel 10 is a plate-shaped member that vibrates depending on vibration of the vibration element 11, and is formed of a material such as, for example, a glass. The vibration element 11 is, for example, a piezoelectric element and is provided on an edge portion of the panel 10 as an example. The vibration element 11 expands or contracts depending on, for example, a driving voltage Vo that is an applied alternating voltage to vibrate the panel 10.

A driving voltage Vo that is applied to the vibration element 11 is generated by the driving unit 3. The driving unit 3 generates a driving voltage Vo that includes a frequency component in an ultrasonic wave band (a frequency band that is substantially higher than or equal to 20 kHz) so as to generate a stripe-shaped region As on the panel 10. Specifically, the driving unit 3 amplifies a modulated signal Sm where a carrier wave Sc in an ultrasonic wave band is modulated by a sound signal Ss in an audible wave band (that is substantially lower than 20 kHz), so that a driving voltage Vo that is applied to the vibration element 11 is generated.

Additionally, a sound signal Ss is input from, for example, an external device 50 that is connected to the speaker device 1. The external device 50 is a device that outputs a sound signal Ss in an audible wave band to the speaker device 1 and a device that is capable of outputting a sound signal Ss to an exterior, such as, for example, an audio device, a car navigation device, a smartphone, or a Personal Computer (PC).

The panel 10 is vibrated by application of a driving voltage Vo to the vibration element 11, so that a standing wave is generated and a stripe-shaped vibration region As is formed on the panel 10. A stripe-shaped vibration region As includes a plurality of band-shaped vibration regions Ag and each of such band-shaped vibration regions Ag functions as a band-shaped sound source that radiates an ultrasonic wave that is modulated by a sound signal Ss.

In an example as illustrated in FIG. 1A, the vibration element 11 that stretches in a transverse direction of the panel 10 (an X-axis direction) is provided on each of both edge portions of the panel 10 in a longitudinal direction thereof (a Y-axis direction). Then, a standing wave is formed in a longitudinal direction of the panel 10 by vibration of the vibration element 11 and a plurality of band-shaped vibration regions Ag that stretch in a transverse direction of the panel 10 are formed at regular intervals in a longitudinal direction of the panel 10. Additionally, a band-shape vibration region Ag is represented by a line shape as an example of being a band shape in FIG. 1A (and FIG. 4 as provided later).

In the speaker device 1, a sound wave that is dependent on a sound signal Ss is generated in a particular direction due to mutual enhancement or interference of ultrasonic waves that are generated from a plurality of band-shaped vibration regions Ag that are thus formed and a spontaneous demodulation phenomenon that is caused by non-linear distortion of an ultrasonic wave that is modulation-processed, and reproduced as an audible sound around an ear of a user. Thereby, the speaker device 1 functions as a speaker device that has a narrow directionality.

Meanwhile, in addition to a first ultrasonic wave that travels in a first direction, a second ultrasonic wave that travels in a second direction that is a direction symmetric with respect to the first direction, where a direction perpendicular to the panel 10 when viewed from a transverse direction of the panel 10 (an X-axis direction) is provided as an axis, is output from each band-shaped vibration region Ag of the speaker device 1.

As illustrated in FIG. 1B, in the speaker device 1, a first ultrasonic wave S1 and a second ultrasonic wave S2 that are generated from band-shaped vibration regions Ag of the panel 10 travel symmetrically where a direction perpendicular to the panel 10 (a Z-axis direction) is provided as an axis. That is, the speaker device 1 has narrow directionalities in two different directions, due to a first ultrasonic wave S1 and a second ultrasonic wave S2 that travel in mutual different directions.

In other words, the speaker device 1 has a first sound radiation region R1 that has a directionality in a first direction that corresponds to a first ultrasonic wave S1 and a second sound radiation region R2 that has a directionality in a second direction that corresponds to a second ultrasonic wave S2.

Hence, by focusing on such a point, the panel 10 of the speaker device 1 in the present embodiment is arranged in such a manner that it is possible for each of a plurality of users to readily listen to a sound by a simple configuration. For example, a case where users are a plurality of passengers that take a vehicle C and the speaker device 1 is mounted on a vehicle interior 100 of the vehicle C is provided as an example.

As illustrated in FIG. 1C, the panel 10 of the speaker device 1 in the present embodiment is arranged in such a manner that a first ultrasonic wave S1 and a second ultrasonic wave S2 that travel in mutual different directions as described above travel toward respectively different passengers.

Specifically, as illustrated in FIG. 1C, for example, two speaker devices 1 are included in the present embodiment, where a first panel 10-1 is arranged between passengers P_FL, P_FR in front seats of a vehicle C and a second panel 10-2 is arranged between passengers P_RL, P_RR in rear seats of the vehicle C.

Additionally, the panel 10 is formed of a material such as a transparent glass as described above, so that such a transparency is utilized where, for example, it is possible to embed it in a screen of a display unit. For example, the first panel 10-1 is arranged to be embedded in a front display 101 that is provided at a center between passengers in front seats of a vehicle C. Furthermore, for example, the second panel 10-2 is arranged to be embedded in a rear display 102 that is provided at a center between passengers in rear seats of a vehicle C.

Herein, the first panel 10-1 is arranged in such a manner that a first ultrasonic wave S1 travels toward a passenger P_FL and a second ultrasonic wave S2 travels toward a passenger P_FR. In other words, as illustrated in FIG. 1C, arrangement is executed in such a manner that a head portion of a passenger P_FL overlaps with a first sound radiation region R1 that is generated by the first panel 10-1 and a head portion of a passenger P_FR overlaps with a second sound radiation region R2 that is generated by the first panel 10-1.

Similarly, the second panel 10-2 is arranged in such a manner that a first ultrasonic wave S1 travels toward a passenger P_RL and a second ultrasonic wave S2 travels toward a passenger P_RR. In other words, as illustrated in FIG. 1C, arrangement is executed in such a manner that a head portion of a passenger P_RL overlaps with a first sound radiation region R1 that is generated by the second panel 10-2 and a head portion of a passenger P_RR overlaps with a second sound radiation region R2 that is generated by the second panel 10-2.

Thereby, it is possible to transmit a sound from a multimedia source that is reproduced on a side of the front display 101 to passengers P_FL, P_FR in front seats of a vehicle C so as to readily listen thereto, due to two different narrow directionalities that are possessed by the first panel 10-1.

Furthermore, it is possible to transmit a sound from a multimedia source that is reproduced on a side of the rear display 102 to passengers P_RL, P_RR in rear seats of a vehicle C so as to readily listen thereto, due to two different narrow directionalities that are possessed by the second panel 10-2. That is, it is possible for each of a plurality of users to readily listen to a sound by a simple configuration.

As described above, the speaker device 1 according to the present embodiment includes the vibration element 11, the driving unit 3, and the panel 10. The driving unit 3 applies, to the vibration element 11, a driving voltage Vo where a carrier wave Sc in an ultrasonic wave band is modulated by a sound signal Ss in an audible wave band.

The panel 10 is provided with the vibration element 11 and arranged in such a manner that the driving unit 3 applies a driving voltage Vo to such a vibration element 11 to form a vibration region As and a first ultrasonic wave S1 and a second ultrasonic wave S2 that are generated from such a vibration region As and travel in mutual different directions travel toward respectively different users.

Therefore, due to the speaker device 1 according to the present embodiment, it is possible for each of a plurality of users to readily listen to a sound by a simple configuration. Additionally, the speaker device 1 according to the present embodiment reproduces, for example, only a sound in a particular frequency band, so that it is possible for each of a plurality of users to listen to a sound more readily.

Furthermore, the speaker device 1 reproduces, for example, only a sound that corresponds to a center channel in surround reproduction, so that it is possible for each of a plurality of users to listen to a sound more readily.

Furthermore, the speaker device 1 reproduces only a sound that corresponds to a particular object in object audio reproduction, so that it is possible for each of a plurality of users to listen to a sound more readily. Such variation examples will be described later in an explanation that uses FIG. 7. Hereinafter, a configuration of the speaker device 1 according to the present embodiment will be explained more specifically.

2. Specific Configuration of Speaker Device 1

Figure 2:
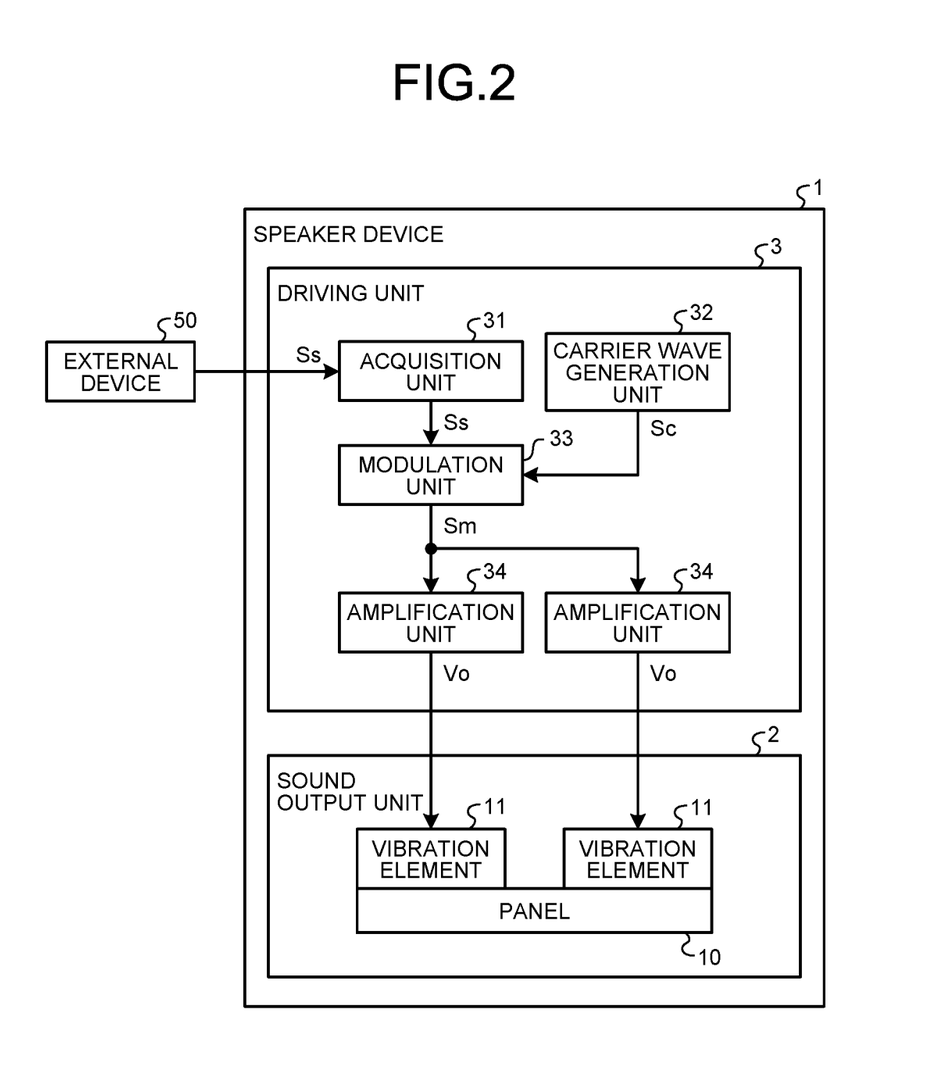
FIG. 2 is a block diagram of a speaker device according to an embodiment.

FIG. 2 is a block diagram of a speaker device 1 according to the present embodiment. Additionally, in FIG. 2, only a component that is needed to explain a feature of the present embodiment is represented by a functional block and a description for a general component is omitted.

In other words, each component as illustrated in FIG. 2 is functionally conceptual and does not have to be physically configured as illustrated therein. For example, a specific mode of dispersion or integration of respective functional blocks is not limited to that illustrated therein and it is possible to functionally or physically disperse or integrate all or a part thereof by an arbitrary unit to provide a configuration, depending on a variety of loads, usage, or the like.

Additionally, FIG. 2 illustrates one speaker device 1. As illustrated in FIG. 2, the speaker device 1 includes a sound output unit 2 and a driving unit 3.

2.1. Sound Output Unit 2

The sound output unit 2 includes a panel 10 and a vibration element 11 that is arranged on the panel 10, as described above.

The panel 10 is a plate-shaped member with a rectangular shape that vibrates depending on vibration of the vibration element 11 and is formed of a material such as, for example, a glass, as described above, where such a glass is not limiting and it is also possible to use another member of a metal, a plastic, or the like. Furthermore, the panel 10 is not limited to a rectangular shape but may be another shape such as a square shape, a circular shape, or a triangular shape.

Additionally, FIG. 2 is a block diagram so that the figure does not illustrate that the panel 10 is arranged in such a manner that a first ultrasonic wave S1 and a second ultrasonic wave S2 that are generated from a vibration region As and travel in mutual different directions travel toward respectively different passengers, as described above.

Figure 3:
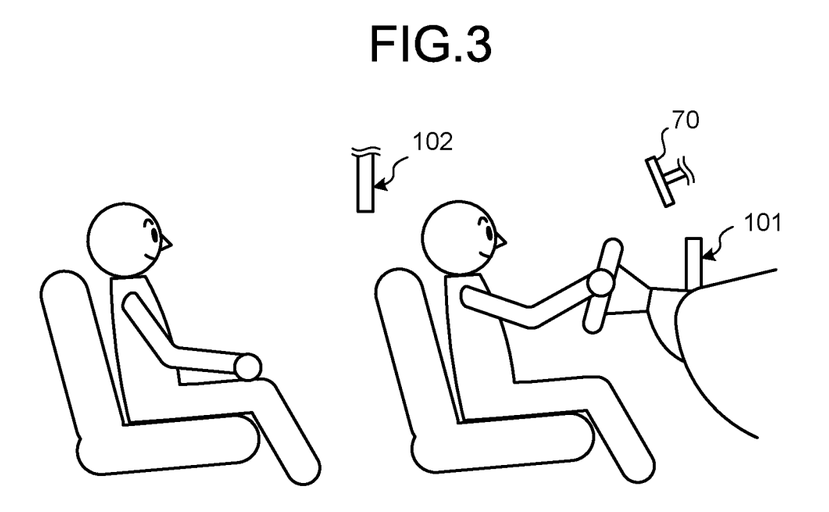
FIG. 3 is a schematic side view illustrating an example of arrangement of a panel.

FIG. 3 is a schematic side view illustrating an example of arrangement of the panel 10. Although a part of an explanation for FIG. 1C overlaps therewith, the panel 10 is arranged to be embedded in, for example, a front display 101 that is provided at a center between passengers in front seats of a vehicle C, as illustrated in FIG. 3. Furthermore, the panel 10 is arranged to be embedded in, for example, a rear display 102 that is provided at a center between passengers in rear seats of a vehicle C and hangs from a ceiling of the vehicle interior 100.

Additionally, otherwise, the panel 10 may be arranged to be embedded in, for example, a rearview mirror 70 that is provided at a center on a top of a front window, or the like. The rearview mirror 70 usually has a mechanism that finely tunes an orientation thereof, so that, as such a mechanism is utilized, it is also possible to finely tune a direction of sound radiation from the panel 10.

An explanation for FIG. 2 is returned to. Although the vibration element 11 is a piezoelectric element as described above, it is sufficient that a configuration is provided to be capable of vibrating at a frequency of a driving voltage Vo that is supplied from the driving unit 3, and a vibration element other than a piezoelectric element may be provided. Furthermore, although a case where two vibration elements 11 are arranged on the panel 10 is illustrated in an example as illustrated in FIG. 2, one or three or more vibration elements 11 may be provided.

2.2. Driving Unit 3

The driving unit 3 generates, and applies to the vibration element 11, a driving voltage Vo for vibrating the vibration element 11. The vibration element 11 is expanded or contracted by a driving voltage Vo that is supplied from the driving unit 3, so that the panel 10 is vibrated and a band-shaped vibration region As that includes a plurality of band-shaped vibration regions Ag is generated on the panel 10.

As illustrated in FIG. 2, the speaker device 1 is connected to an external device 50, vibrates the panel 10 based on a sound signal Ss that is input from the external device 50, and generates an ultrasonic wave that is dependent on a carrier wave Sc that is modulated by a sound signal Ss.

The external device 50 is a device that outputs a sound signal Ss in an audible band to the speaker device 1 as described above, where, for example, in the present embodiment, sound signals Ss from different multimedia sources are output to respectively different speaker devices 1.

The driving unit 3 includes an acquisition unit 31, a carrier wave generation unit 32, a modulation unit 33, and an amplification unit 34, generates a driving voltage Vo for vibrating the vibration element 11, and applies the generated driving voltage Vo to the vibration element 11. Such a driving unit 3 includes, for example, a computer that has a Central Processing Unit (CPU), a Read Only Memory (ROM), a Random Access Memory (RAM), a Hard Desk Drive (HDD), an input/output port, and the like, and a variety of circuits such as an amplification circuit.

A CPU of a computer reads and executes, for example, a variety of programs that are stored in a ROM, and thereby, functions as the acquisition unit 31, the carrier wave generation unit 32, and the modulation unit 33 of the driving unit 3. Furthermore, it is also possible to compose at least one or all of the acquisition unit 31, the carrier wave generation unit 32, and the modulation unit 33 of the driving unit 3 of hardware such as an Application Specific Integrated Circuit (ASIC) or a Field Programmable Gate Array (FPGA). Furthermore, the amplification unit 34 is composed of, for example, an amplification circuit such as a power amplifier.

The acquisition unit 31 acquires a sound signal Ss that is output from the external device 50 and outputs the acquired sound signal Ss to the modulation unit 33. Additionally, it is also possible for the acquisition unit 31 to tune a gain (amplitude) of a sound signal Ss and output the sound signal Ss after tuning thereof to the modulation unit 33. Furthermore, the acquisition unit 31 may have a low-pass filter that passes a signal in an audible wave band and it is possible to eliminate a signal other than an audible wave band by such a low-pass filter.

The carrier wave generation unit 32 generates a carrier wave Sc and outputs it to the modulation unit 33. A carrier wave Sc is a sinusoidal signal in an ultrasonic wave band, generates a standing wave on the panel 10, and has a frequency to form a band-shaped vibration region As.

The modulation unit 33 generates, and outputs to the amplification unit 34, a modulation signal Sm that is a signal where a carrier wave Sc that is input from the carrier wave generation unit 32 is modulated by a sound signal Ss that is input from the acquisition unit 31. Modulation that is executed by the modulation unit 33 is executed by an Amplitude Modulation (AM) modulation or a Frequency Modulation (FM) modulation. Additionally, AM modulation is, for example, a Double Sideband (DSB) modulation or a Single Sideband (SSB) modulation.

A modulation signal Sm that is output from the modulation unit 33 to the amplification unit 34 is amplified by each amplification unit 34 and applied to each vibration element 11 as a driving voltage Vo that is an alternating voltage dependent on a wave form of a modulation signal Sm. The vibration element 11 stretches depending on an applied driving voltage Vo to generate a standing wave on the panel 10. An antinode of such a standing wave is a band-shaped vibration region Ag.

Figure 4:
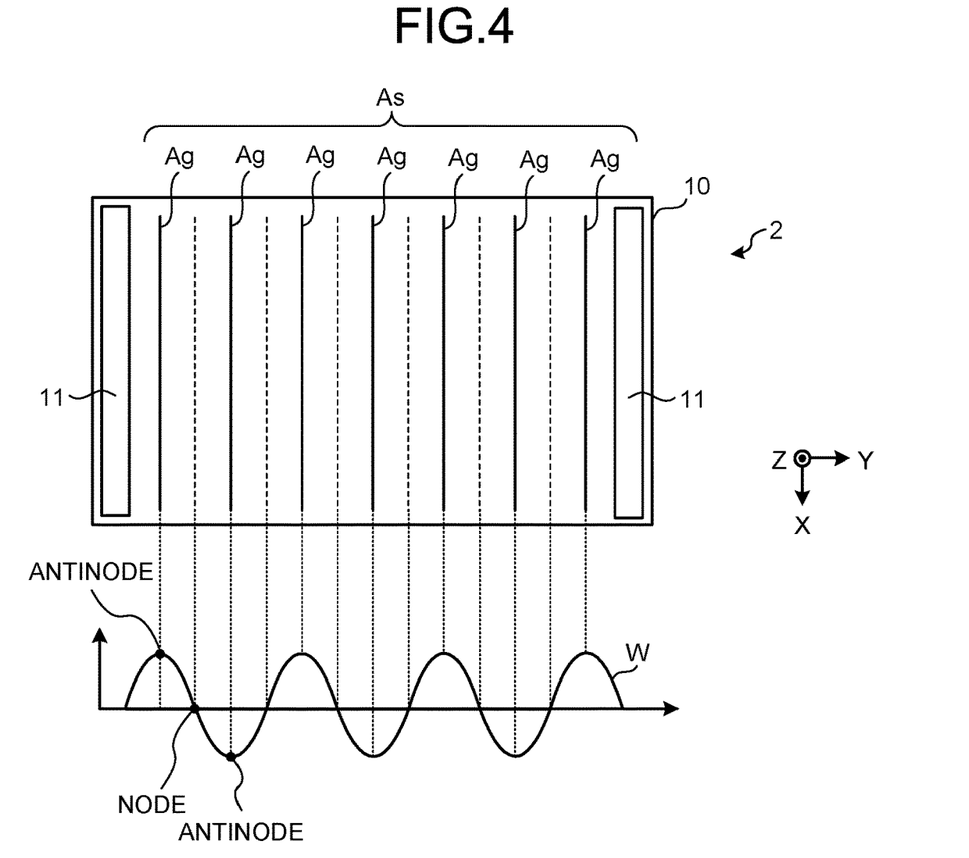
FIG. 4 is a diagram illustrating a relationship between a band-shaped vibration region that is formed on a panel and a standing wave.

FIG. 4 is a diagram illustrating a relationship between a band-shaped vibration region Ag that is formed on a panel 10 and a standing wave W. In FIG. 4, an antinode of a standing wave W is represented by a solid line and a node of a standing wave W is represented by a broken line, where an antinode portion of a standing wave W functions as a band-shaped vibration region Ag. Antinode portions of a standing wave W are generated at regular intervals in a longitudinal direction (a Y-axis direction) of the panel 10, so that band-shaped vibration regions Ag are generated at regular intervals in a longitudinal direction of the panel 10. Additionally, although FIG. 4 illustrates, for a purpose of illustration, an example of seven band-shaped vibration regions Ag that are generated by a standing wave W in a longitudinal direction of the panel 10, the number of band-shaped vibration regions Ag is not limited to seven, and further, it is possible to increase it with increasing a frequency of a carrier wave Sc.

Figure 5:
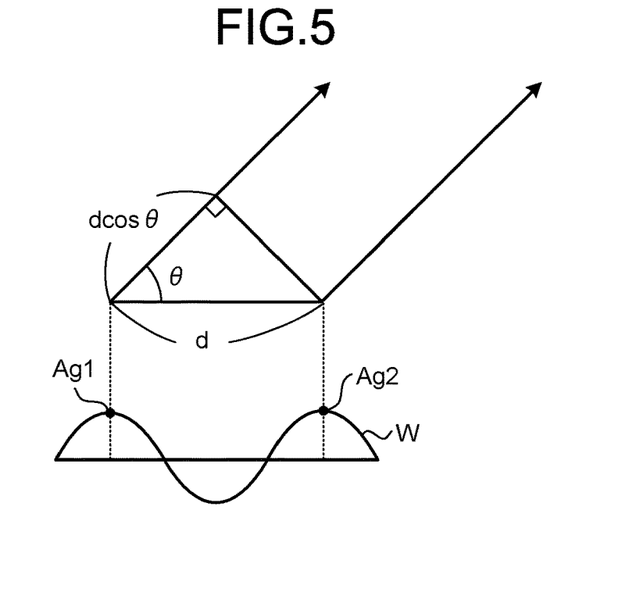
FIG. 5 is a diagram for explaining a relationship between a standing wave that is formed on a panel and a directionality of a speaker device.

Next, a directionality of the speaker device 1 will be explained. FIG. 5 is a diagram for explaining a relationship between a standing wave W that is formed on the panel 10 and a directionality of the speaker device 1. FIG. 5 partially illustrates a standing wave W for readily understanding an explanation. Furthermore, adjacent antinodes with identical phases in a standing wave W are band-shaped vibration regions Ag1, Ag2 and an angle $\theta$ of ultrasonic waves that are generated in band-shaped vibration regions Ag1, Ag2 with respect to the panel 10 is represented therein.

Phases of ultrasonic waves that are generated in band-shaped vibration regions Ag1, Ag2 are shifted by a distance of d cos $\theta$ with respect to an arbitrary angle $\theta$. As $\lambda$ is a wavelength of a carrier wave Sc, ultrasonic waves that are generated in band-shaped vibration regions Ag1, Ag2 are mutually canceled at an angle $\theta$ where a distance of d cos $\theta$ is an odd multiple of a wavelength of $\lambda/2$. That is, ultrasonic waves are canceled at an angle $\theta$ where a distance of d cos $\theta$ is an odd multiple of a wavelength of $\lambda/2$. On the other hand, ultrasonic waves that are generated in band-shaped vibration regions Ag1, Ag2 are mutually enhanced at an angle $\theta$ where a distance of d cos $\theta$ is an integral multiple of a wavelength of $\lambda$ (an even multiple of a wavelength of $\lambda/2$). Then, a sound wave in an audible wave band is generated by a spontaneous demodulation phenomenon that is caused by non-linear distortion of an ultrasonic wave when the ultrasonic wave propagates through a space or when the ultrasonic wave is reflected from an object.

Thus, ultrasonic waves that are generated from a plurality of band-shaped vibration regions Ag are phase-interfered (enhanced and canceled), so that it is possible to cause such ultrasonic waves to travel in a particular direction. Then, a sound wave in an audible wave band is generated by a spontaneous demodulation phenomenon that is caused by non-linear distortion of an ultrasonic wave, so that it is possible for the speaker device 1 to have a narrow directionality in a particular direction.

Thus, although it is possible for the speaker device 1 to have a narrow directionality in a particular direction, an angle $\theta$ where ultrasonic waves are mutually enhanced (that will be described as an angle $\theta$d below) is present symmetrically with respect to an axis that is orthogonal to the panel 10.

Figure 6:
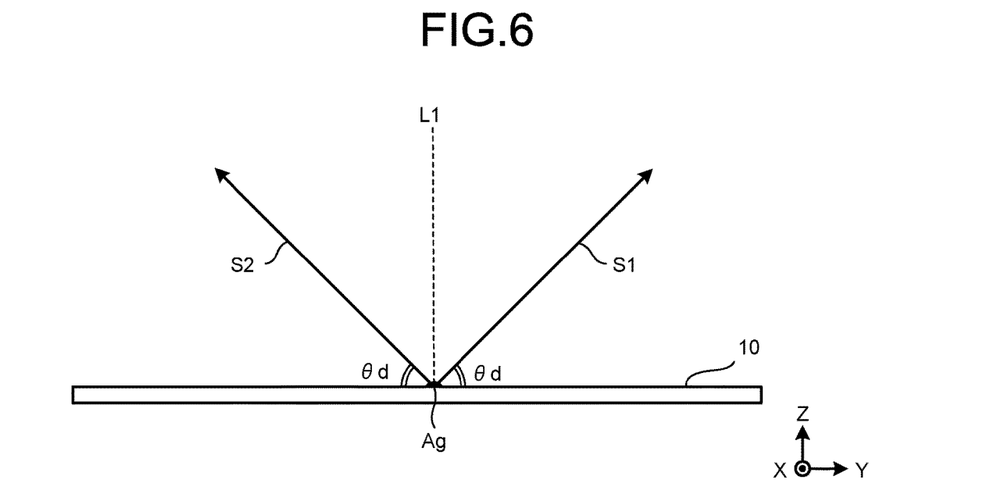
FIG. 6 is a diagram illustrating a relationship between an angle where ultrasonic waves are mutually enhanced and directions of travel of the ultrasonic waves.

FIG. 6 is a diagram illustrating a relationship between an angle $\theta$d where ultrasonic waves are mutually enhanced and directions of travel of the ultrasonic waves. As illustrated in FIG. 6, a first ultrasonic wave S1 and a second ultrasonic wave S2 that are generated at angle $\theta$d from respective band-shaped vibration regions Ag travel in, for example, a direction that is symmetric with respect to an axis L1 that is orthogonal to a panel 10. Hence, a speaker device 1 has narrow directionalities in two different directions.

3. Variation Example

Meanwhile, as described above, as sounds are mixed at front and rear of the vehicle interior 100, for example, it may be difficult to listen to a navigation sound or the like in a front seat while it may be difficult to listen to a speech in a video in a rear seat, understanding of respective contents may be hindered.

Hence, in the present embodiment, not only the panel 10 is merely arranged in such a manner that a first ultrasonic wave S1 and a second ultrasonic wave S2 that are generated from a vibration region As and travel in mutually different directions travel toward respectively different users, but also it is possible to specialize a sound that is output from the panel 10 in such a manner that it is possible for a user to improve understanding of a content.

Figure 7:
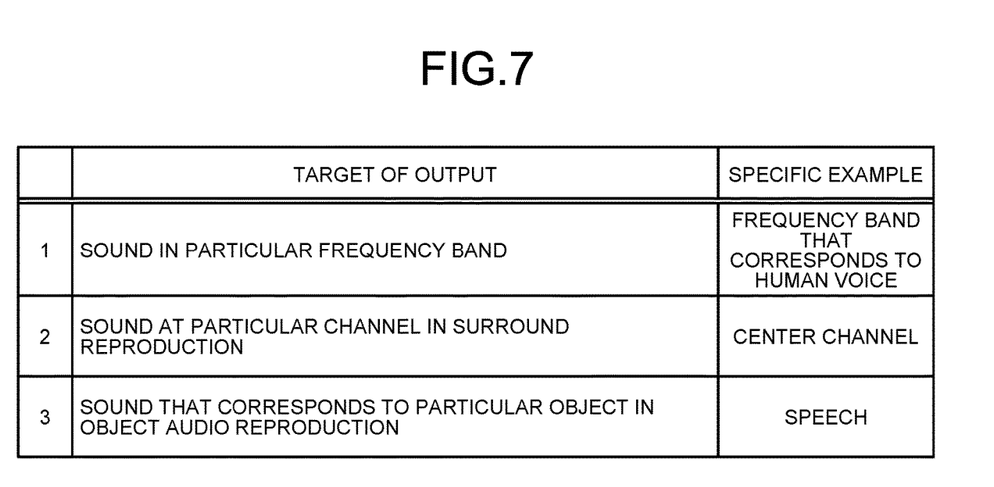
FIG. 7 is an explanatory diagram of a variation example.

FIG. 7 is an explanatory diagram of a variation example. As illustrated in "1" of FIG. 7, it is possible for the speaker device 1 to provide, for example, a sound in a particular frequency band as a target of output. As a specific example, a frequency band that corresponds to a human voice is provided. Additionally, it is sufficient that another frequency band, for example, a bass sound or the like, is output from another speaker that is arranged on a door of a vehicle C.

Thereby, for example, it is possible for a user to readily listen to a sound that corresponds to a human voice such as a navigation sound or a speech in a video. Furthermore, it is possible to arrange the speaker device 1 on the front display 101, the rear display 102, or the like, as described above, so that it is possible to radiate a sound that corresponds to a human voice at a height that is equivalent to that of a head portion of a user or higher and it is possible for a user to readily perceive a human voice or the like more naturally. Therefore, it is possible to contribute to improving of understanding of a content by a user.

Additionally, a sound signal in a particular frequency band may be acquired from the external device 50 or may be extracted by a filtering process of the acquisition unit 31 of the driving unit 3.

Furthermore, as illustrated in "2" of FIG. 7, it is possible for the speaker device 1 to provide, for example, a sound at a particular channel in surround reproduction as a target of output. As a specific example, a center channel in surround reproduction is provided. It is possible to realize this by composing a center speaker of the speaker device 1 according to the present embodiment, for example, in a case where a surround reproduction system for 5.1 ch or 7.1 ch is established.

Thereby, a user readily listens to, for example, a speech or the like in a video, in particular, a movie, so that it is possible to contribute to improving of understanding of a content by a user. Furthermore, it is also possible to radiate a sound that corresponds to a human voice at a height that is equivalent to that of a head portion of a user or higher, so that it is possible for a user to readily perceive a human voice or the like more naturally.

Furthermore, as illustrated in "3" of FIG. 7, it is possible for the speaker device 1 to provide, for example, a sound that corresponds to a particular object in object audio reproduction as a target of output. As a specific example, an object that corresponds to, for example, a speech as described above is provided. Furthermore, an object at a position that substantially coincides with a direction of sound radiation of the speaker device 1 when viewed from a user may be provided.

Thereby, a user also readily listens to a speech in a movie or the like, so that it is possible to contribute to improving of understanding of a content by a user. Furthermore, it is possible to radiate a sound that corresponds to an object at a position that substantially coincides with a direction of sound radiation of the speaker device 1, so that it is possible for a user to readily perceive a human voice or the like more naturally.

Additionally, a rendering function to render an object may be possessed on a side of the external device 50 or may be possessed by the acquisition unit 31 of the driving unit 3.

As described above, a speaker device 1 according to the present embodiment includes a vibration element 11, a driving unit 3, and a panel 10. The driving unit 3 applies, to the vibration element 11, a driving voltage Vo (that corresponds to an example of a "driving signal") where a carrier wave Sc in an ultrasonic wave band is modulated by a sound signal Ss in an audible wave band. The panel 10 is provided with the vibration element 11 and arranged in such a manner that a driving voltage Vo is applied to such a vibration element 11 by the driving unit 3 to form a vibration region As and a first ultrasonic wave S1 and a second ultrasonic wave S2 that are generated from such a vibration region As and travel in mutually different directions travel toward respectively different users.

Therefore, due to the speaker device 1 according to the present embodiment, it is possible for each of a plurality of users to readily listen to a sound by a simple configuration.

Furthermore, a user is a passenger of a vehicle C, and the panel 10 is a first panel 10-1 that is arranged between passengers in front seats of the vehicle C and a second panel 10-2 that is arranged between passengers in rear seats of the vehicle C.

Therefore, due to the speaker device 1 according to the present embodiment, it is possible for each of passengers in a front seat and a rear seat of a vehicle C to readily listen to a sound by a simple configuration.

Furthermore, the first panel 10-1 is arranged on a front display 101 (that corresponds to an example of a "first display part") that is provided between passengers in front seats of a vehicle C, and the second panel 10-2 is arranged on a rear display 102 (that corresponds to an example of a "second display part") that is provided between passengers in rear seats of the vehicle C.

Therefore, due to the speaker device 1 according to the present embodiment, a unique installation space for the panel 10 does not have to be prepared. That is, it is possible for each of passengers in a front seat and a rear seat of a vehicle C to readily listen to a sound by a simple configuration.

Furthermore, the driving unit 3 is a first driving unit that corresponds to the first panel 10-1 and a second driving unit that corresponds to the second panel 10-2, and the first driving unit and the second driving unit apply, to the vibration element 11, a driving voltage Vo where a carrier wave Sc is modulated by sound signals Ss from respectively different multimedia sources (that corresponds to an example of "sound sources").

Therefore, due to the speaker device 1 according to the present embodiment, it is possible to realize a reproduction system that is capable of reproducing respectively independent multimedia sources on a front seat side and a rear seat side of a vehicle C by a simple configuration.

Furthermore, the driving unit 3 applies, to the vibration element 11, a driving voltage Vol where a carrier wave Sc is modulated by a sound signal Ss in a predetermined frequency band.

Therefore, due to the speaker device 1 according to the present embodiment, for example, only a sound in a frequency band that corresponds to a human voice is output, so that it is possible for a user to readily listen to a speech in a movie or the like and it is possible to contribute to improving of understanding of a content by a user.

Furthermore, the driving unit 3 applies, to the vibration element 11, a driving voltage Vo where a carrier wave Sc is modulated by a sound signal Ss that corresponds to a center channel in surround reproduction.

Therefore, due to the speaker device 1 according to the present embodiment, it is possible for a user to readily listen to a speech or the like that is mainly assigned to a center channel in surround reproduction and it is possible to contribute to improving of understanding of a content by a user.

Furthermore, the driving unit 3 applies, to the vibration element 11, a driving voltage Vo where a carrier wave Sc is modulated by a sound signal Ss that corresponds to a particular object in object audio reproduction.

Therefore, due to the speaker device 1 according to the present embodiment, it is possible for a user to readily listen to a particular object in object audio reproduction and it is possible to contribute to improving of understanding of a content by a user.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A speaker device, comprising:
   a panel;
   a vibrator that vibrates the panel; and
   a driver that applies, to the vibrator, a driving signal to form a striped vibration region on the panel where a carrier wave in an ultrasonic wave band is modulated by a sound signal in an audible wave band, the striped vibration region including a plurality of line-shaped vibration regions caused by a standing wave generated on the panel, wherein
   a plurality of first ultrasonic waves and a plurality of second ultrasonic waves are generated by interference between ultrasonic waves generated from the plurality of line-shaped vibration regions, each of the first ultrasonic waves radiating from a corresponding line-shaped vibration region in a first direction, and each of the second ultrasonic waves radiating from the corresponding line-shaped vibration region in a second direction, which is different from the first direction, and
   the panel is arranged in such a manner that the each of the first ultrasonic waves and the each of the second ultrasonic waves that are radiating from the corresponding line-shaped vibration region travel toward respective users positioned in different locations.

2. The speaker device according to claim 1, wherein the users are passengers of a vehicle, and
   the panel is a first panel that is arranged between passengers in front seats of the vehicle and a second panel that is arranged between passengers in rear seats of the vehicle.

3. The speaker device according to claim 2, wherein the first panel is arranged on a first display part that is provided between passengers in front seats of the vehicle, and
   the second panel is arranged on a second display part that is provided between passengers in rear seats of the vehicle.

4. The speaker device according to claim 2, wherein the driver is a first driver that corresponds to the first panel and a second driver that corresponds to the second panel, and
   the first driver and the second driver apply, to the vibrator, the driving signal where the carrier wave is modulated by the sound signals from respectively different sound sources.

5. The speaker device according to claim 3, wherein the driver is a first driver that corresponds to the first panel and a second driver that corresponds to the second panel, and
   the first driver and the second driver apply, to the vibrator, the driving signal where the carrier wave is modulated by the sound signals from respectively different sound sources.

6. The speaker device according to claim 1, wherein the driver applies, to the vibrator, the driving signal where the carrier wave is modulated by the sound signal in a predetermined frequency band.

7. The speaker device according to claim 2, wherein the driver applies, to the vibrator, the driving signal where the carrier wave is modulated by the sound signal in a predetermined frequency band.

8. The speaker device according to claim 3, wherein the driver applies, to the vibrator, the driving signal where the carrier wave is modulated by the sound signal in a predetermined frequency band.

9. The speaker device according to claim 4, wherein the driver applies, to the vibrator, the driving signal where the carrier wave is modulated by the sound signal in a predetermined frequency band.

10. The speaker device according to claim 5, wherein the driver applies, to the vibrator, the driving signal where the carrier wave is modulated by the sound signal in a predetermined frequency band.

11. The speaker device according to claim 1, wherein the driver applies, to the vibrator, the driving signal where the carrier wave is modulated by the sound signal that corresponds to a center channel in surround reproduction.

12. The speaker device according to claim 1, wherein the driver applies, to the vibrator, the driving signal where the carrier wave is modulated by the sound signal that corresponds to a particular object in object audio reproduction.

13. A sound output method that uses a speaker device that includes a panel, a vibrator that vibrates the panel, a driver that applies, to the vibrator, a driving signal to form a striped vibration region on the panel where a carrier wave in an ultrasonic wave band is modulated by a sound signal in an audible wave band, the striped vibration region including a plurality of line-shaped vibration regions caused by a standing wave generated on the panel, wherein a plurality of first ultrasonic waves and a plurality of second ultrasonic waves are generated by interference between ultrasonic waves generated from the plurality of line-shaped vibration regions, each of the first ultrasonic waves radiating from a corresponding line-shaped vibration region in a first direction, and each of the second ultrasonic waves radiating from the corresponding line-shaped vibration region in a second direction, which is different from the first direction,
   the sound output method comprises:
   causing the each of the first ultrasonic waves and the each of the second ultrasonic waves that are radiating from the corresponding line-shaped vibration region to travel toward respectively different respective users positioned in different locations.

* * * * *